United States Patent [19]

Silverman et al.

[11] Patent Number: 5,137,777
[45] Date of Patent: Aug. 11, 1992

[54] FIRE-RETARDANT POLYMER FOAM COMPOSITES

[75] Inventors: Lance D. Silverman, New Hope, Pa.; Warren F. Legg, Worthington; Wilfred E. Willis, Grayson, both of Ky.

[73] Assignee: Ametek, New York, N.Y.

[21] Appl. No.: 625,534

[22] Filed: Dec. 11, 1990

[51] Int. Cl.$^5$ .................. B32B 3/10; B32B 3/24; B32B 31/00

[52] U.S. Cl. .................. 428/316.6; 428/198; 428/317.1; 428/317.7; 428/921

[58] Field of Search .................. 428/198, 316.6, 317.1, 428/317.7, 921

[56] References Cited

U.S. PATENT DOCUMENTS

| | | | |
|---|---|---|---|
| 2,878,153 | 3/1959 | Hacklander | 426/316.6 |
| 3,384,696 | 5/1968 | Makansi | 428/131 |
| 3,647,609 | 3/1972 | Cuba | 428/316.6 |
| 3,719,736 | 3/1973 | Woodruff | 264/156 |
| 3,867,240 | 2/1975 | Doerfling | 428/316.6 |
| 3,934,066 | 1/1976 | Murch | 428/248 |
| 4,021,291 | 5/1977 | Joice | 156/513 |
| 4,086,384 | 4/1978 | Adelman et al. | 428/213 |
| 4,110,508 | 8/1978 | Isqur et al. | 428/240 |
| 4,121,960 | 10/1978 | Focht | 156/219 |
| 4,185,402 | 1/1980 | Digate | 36/44 |
| 4,257,176 | 3/1981 | Hartung et al. | 36/44 |
| 4,263,360 | 4/1981 | Adelman | 428/238 |
| 4,302,496 | 11/1981 | Donvan | 428/196 |
| 4,410,595 | 10/1983 | Matsomoto et al. | 428/412 |
| 4,432,822 | 2/1984 | Adams et al. | 156/148 |
| 4,433,026 | 2/1984 | Molde | 428/252 |
| 4,463,465 | 8/1984 | Parker et al. | 5/459 |
| 4,575,471 | 3/1986 | Wong | 428/137 |
| 4,578,297 | 3/1986 | Duncan | 428/313.3 |
| 4,619,553 | 10/1986 | Fischer | 405/63 |
| 4,642,912 | 2/1987 | Wildman et al. | 36/44 |
| 4,657,610 | 4/1987 | Komatsu et al. | 156/87 |
| 4,704,323 | 11/1987 | Duncan et al. | 428/286 |
| 4,726,987 | 2/1988 | Trask et al. | 428/282 |
| 4,746,565 | 5/1988 | Bafford et al. | 428/251 |
| 4,758,297 | 7/1988 | Calligarich | 156/251 |
| 4,764,420 | 8/1988 | Gluck et al. | 428/317.7 |
| 4,780,359 | 10/1988 | Trask et al. | 428/234 |
| 4,872,220 | 10/1989 | Haruvy et al. | 428/286 |
| 4,892,769 | 1/1990 | Perdelwitz, Jr. et al. | 428/68 |
| 5,066,531 | 11/1991 | Legg et al. | 428/198 |

OTHER PUBLICATIONS

*Kirk-Othmer Encyclopedia of Chemical Tech.* vol. 10 (348-354) John-Wiley & Sons, N.Y. 3ded. 1980.
*The encyclopedia of Polymer Science and Engineering,* vol. 7, 154-155, 178-185 (John-Wiley & Sons, N.Y. 2d ed 1987.
Ametek "Protective Packaging"–Microfoam Division, pamphlet 4 pages (1989).

*Primary Examiner*—William J. Van Balen
*Attorney, Agent, or Firm*—Ratner & Prestia

[57] ABSTRACT

A fire retardant polymer foam composite suitable for the making of packaging material, including a thin film of fire-retardant plastic extruded between layers of polymer foam sheets and bonded together to form a composite sheet of material having a sandwich structure.

13 Claims, 1 Drawing Sheet

FIRE-RETARDANT POLYMER FOAM COMPOSITES

FIELD OF THE INVENTION

This invention relates to polymer foam composite sheets having fire-retardant properties such as resistance to ignition, resistance to flame propagation, and low smoke production during smoldering or burning.

BACKGROUND OF THE INVENTION

Fire-retardant polymer foam materials are often used in packaging applications. They are commonly used in the form of sheets, for example, to wrap objects and, thus, to protect the wrapped objects from damage caused by impact or abrasion during shipping.

There are a variety of approaches to making fire-retardant polymeric materials, many of which can be used to make polymer foam materials. One approach is to compound fire-retardant additives with the polymer during foam fabrication. In another approach, fire-retardant additives are applied as a coating to the preformed polymer foam material. These technologies are reviewed in Kirk-Othmer Encyclopedia of Chemical Technology, John-Wiley (New York, 3d ed. 1978) and in The Encyclopedia of Polymer Science and Engineering, John-Wiley (New York, 2d ed. 1985).

A disadvantage of the first of the aforementioned approaches is the perturbation of the manufacturing process in making the polymer foam material. As discussed below, the use of additives with a polymer makes the properties of the material less suitable in the preferable foam manufacturing process. The alteration of the material properties may also render the polymer foam less desirable as a final product. Those disadvantages are avoided by the present invention.

In the commercial manufacture of, for example, polypropylene foam packaging materials, the foam is extruded and formed as the polymer solution exits the extrusion device. The use of fire-retardant additives in the polymer solution can deleteriously affect the foam extrusion manufacturing process or the properties of the final foam product. For example, if the additives do not totally dissolve in the polymer solution before extrusion, the undissolved additives can act as nuclei which alter the cell structure of and weaken the foam.

On the other hand, to the extent that fire-retardant additives do dissolve in the polymer solution before extrusion, the additives alter the vapor pressures of the blowing agents and inflatants used in the foam extrusion process. This can adversely affect the manufacturing process and the final product, requiring major processing changes to produce an acceptable fire-retardant foam product. In addition, many fire-retardant additives, including the most common and least expensive halogenated organic additives, are unstable under the processing conditions used to make certain foams. Thus, they could not be used; rather, their less common and more expensive counterparts would be required.

The second alternative approach to constructing fire-retardant polymeric materials, using fire-retardant additives and a binder to coat the polymer foam, presents its own problems. These coatings can adversely affect the "hand" of the polymer foam composite material, for example, because the additives appear on the external surface of the material. Similarly, the fire-retardant coating can flake or rub off onto the packaged objects, or possibly onto the hands of those handling the product—creating health and safety concerns.

In the manufacture of thick foam sheets, regardless of their fire-retardant properties, a separate bonding step is often necessary. The bonding step builds a thick foam sheet composite from the separate, thinner sheets after the thinner sheets have been extruded. The extruded sheets are laminated, or layered, and bonding can be achieved using a variety of techniques—including hot pin perforation or the application of conventional adhesives. As a method of forming a fire-retardant polymer foam composite, a one-step extrusion lamination technique is preferable: the composite layers bond together upon extrusion, as part of the process for incorporating the fire-retardant additives, and a separate bonding step to increase thickness is therefore unnecessary.

To overcome the shortcomings of existing fire-retardant polymeric materials, a new polymer foam composite is provided. An object of the present invention is to provide an improved polymer foam composite without perturbing the manufacturing steps used to make the foam itself. A related object is to avoid the need for the separate bonding steps often used to build thicker, multiply foam products from thinner piles. Another object is to incorporate the fire-retardant additives without interfering with the appearance, feel, frictional properties, and safety in handling of the foam.

It is still another object of the present invention to incorporate relatively inexpensive additives, in lesser amounts, than used by conventional coated products—while improving (by reducing) flame spread and smoke density test results. An additional object is to improve the physical properties of the composite, such as puncture resistance and tear strength. Yet another object of this invention is to allow manufacturing flexibility by using existing extrusion-lamination equipment, currently used to make similar products, for making the polymer foam composite of the present invention. The need for special coating and drying equipment is thereby avoided.

SUMMARY OF THE INVENTION

To achieve these and other objects, and in view of its purposes, the present invention provides a thin, plastic film which contains fire-retardant additives and is bonded between two polymer foam sheets. Although the polymer foam sheets contain no fire-retardant additives, the composite material, consisting of the core film layer between polymer foam layers, provides flame resistant additives which, when exposed to fire, greatly improve the composite material's fire-retardant properties.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing, in which.

DETAILED DESCRIPTION OF THE INVENTION

Figure 1:
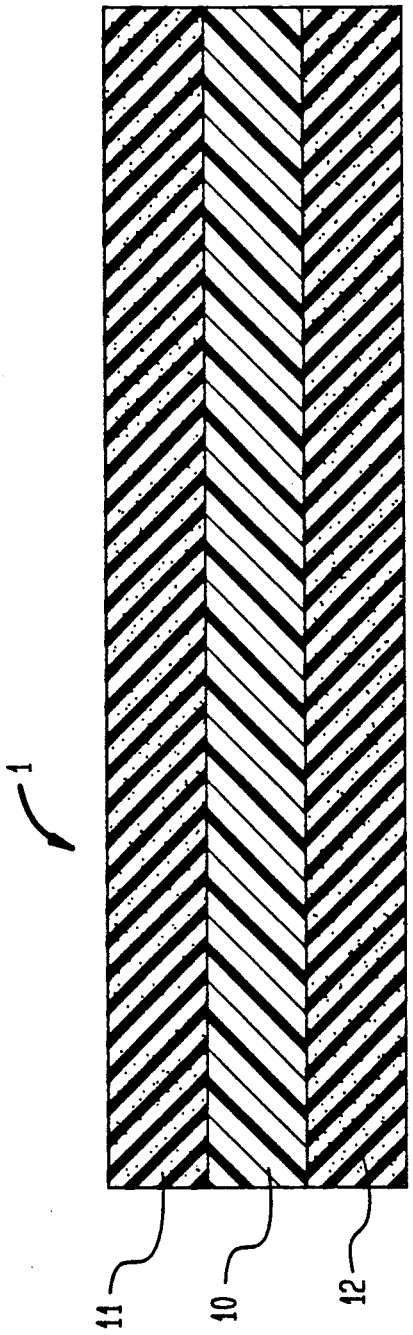
FIG. 1, the sole FIG., is a cross-sectional view of a preferred embodiment of the three-ply fire-retardant foam polymer composite according to the present invention.

The sole FIG. shows a three-ply, fire-retardant foam polymer composite 1 including a foam polymer upper layer 11, a foam polymer lower layer 12, and a plastic core film interlayer 10 affixed therebetween. (It should be noted that the FIG. is not drawn to scale; in particular, the film interlayer 10 is greatly oversized, as shown, in relation to the foam layers 11 and 12.) In accordance with the present invention, the composite 1 is made by lamination of two polymer foam sheets 11 and 12 with a thin film of flame retardant plastic 10. In its preferred embodiment, the composite 1 has a sandwich structure, with the fire-retardant film 10 sandwiched between the two foam sheets 11 and 12.

The invention further provides for the use of the composite 1 in packaging applications, where it can be applied to wrap objects for their protection during shipping. The foam sheets 11 and 12 lend desirable properties to the composite 1 for packaging applications, such as the ability to protect packaged objects from impact or abrasion. The film 10 acts to carry fire-retardant additives into the composite 1 such that the composite 1 will have desirable fire-retardant properties. Also, the interlayer film 10 may be formulated to lend other desirable properties to the composite 1, such as improved impact and tear resistance.

The composite 1 of the present invention can be made by an extrusion lamination process. In this process, a fire-retardant film 10, consisting of fire-retardant additives compounded with a thermoplastic polymer, is extruded between two sheets of polymer foam 11 and 12. The interlayer film 10 acts to bond the polymer foam sheets 11 and 12 together, as well as to lend fire-retardant properties to the composite 1. This avoids the need for a separate bonding step to build thicker foam sheet products from thinner sheets. Also, the fire-retardant additives are contained under the sheets of polymer foam reducing the possibility of flaking or rubbing-off of the retardant onto packaged objects or package handlers.

Furthermore, in the present invention, fire-retardant additives are not added to the polymer foam during the foam manufacturing process, assuring consistent foam structure and consistent vapor pressures of the blowing agents and inflatants used in the process. The absence of fire-retardant additives from the foam during manufacturing may also make it easier for the manufacturer to satisfy Federal Food and Drug Administration standards for the quality of foam systems.

In an alternative embodiment of the method of manufacture of the present invention described above, foam layers 11 and 12 used in the extrusion lamination process may themselves contain two or more foam layers which were previously bonded, for example, by hot pin bonding. Thus, foam layers 11 and 12 in FIG. 1 could be either single or multi-ply foam sheets. This allows greater flexibility in manufacturing and better control of the thickness of the final product.

In still another alternative embodiment of the method of manufacture of the present invention described above, the composite 1 is formed by hot pin perforation bonding. Lower foam polymer layer 12, a pre-formed plastic core film interlayer 10, and upper foam polymer layer 11 are simultaneously fed as continuous webs, in discrete or indefinite lengths, from supply rolls to a forming table where they overlay one another. Successive lengths of the overlaid materials are compressed, then perforated with hot pins. These hot pins create localized melt holes through the thickness of the resulting composite. The melted material lines the holes thus produced and bonds the layers together. After the hot pins are removed, the locally melted areas are cooled, the composite is released from compression, and another length is brought onto the forming table. Thus, a continuous hot pin bonded composite is produced.

Alternatively, hot pin bonding can be done continuously by feeding the unbound layers between two rollers. At least one of the rollers is heated and has hot pins. The layers are compressed, then perforated and bonded with the hot pins, and the material is released—all occurring in concert between the rollers. Whether formed on a forming table or between two rollers, the resulting composite may be cut to any desired length by conventional cutting apparatus.

Once made, the polymer foam composite 1 of the present invention can be incorporated into a variety of foam products. The composite 1 could, for example, form one layer of a plank foam product. Such planks are formed by bonding numerous foam sheets to create a relatively thick and inflexible laminate. If the outer sheet layer were the composite 1, the plank would be protected by the fire-retardant properties offered by the composite. Alternatively, the composite 1 structure could be repeated over and over to yield a plank composed entirely of composite 1 structures.

It has been discovered from the results of flame spread and smoke tests, that the polymer foam composite 1 of the present invention is a superior fire barrier to coated foam products using similar additives in similar or even greater amounts. Burning of a solid material is a surface reaction, and it is very surprising that this invention, in which the fire-retardant additives are on the inside of the sandwich structure, performs so well. It was not expected that a fire-retardant core with an intrinsically flammable outside layer would out-perform products having fire-retardant outside layers. Although the reason for the superior performance of the polymer foam composite 1 of the present invention over the coated foam products as a fire-retardant material is uncertain, it is theorized that, when exposed to flame, the foam sheets 11 and 12 collapse and melt back from an ignition source. Thus, the flame-retardant film core 10 may mix with the polymer from the foam before ignition, flame spread, and smoke production are possible.

In the manufacture of coated foam products, the process of applying a coating, drying it, and curing it requires additional plant equipment to that used in the extrusion lamination process. The ability to make the fire-retardant product of the present invention using lamination equipment, therefore, may avoid the need to purchase additional capital equipment.

Furthermore, because the flame retardant additives are incorporated internally in the foam composite 1 of the present invention, the foam composite 1 has the same appearance, feel, and frictional properties as do foam sheets which are not part of a composite. By maintaining these properties, both performance and marketing goals are realized.

The following examples serve to illustrate the present invention. All parts and percentages are by weight, unless otherwise indicated.

EXAMPLE 1

Samples of sandwich composites were prepared by extrusion lamination of two ⅛ inch single-ply sheets of Microfoam (registered trade mark, for a polypropylene foam, of Ametek, Inc.). The two foam sheets were bound together with an extruded polyethylene interlayer. The interlayer contained 20% of a commercial fire-retardant additive (Schulmans 770C concentrate), including an aromatic bromide compound and antimony oxide in a polyethylene base, and 80% polyethylene (Rexene 5050). Laminar composites were made with interlayers of varied thicknesses, ranging from 0.56 mil to 2 mils.

These laminar composites were screened for fire-retardant properties using a modified NASA flame spread test. In this test a 4 in. by 12 in. piece of laminar foam product is held vertically in a metal frame and is ignited by a Bunsen burner under carefully controlled conditions. This test showed that samples with film interlayers of less than one mil thickness were difficult to ignite, self-extinguished within 3 inches of burning, and produced no visible smoke. Duplicate tests were performed for samples with interlayer thickness of 0.86, 0.76, and 0.56 mils. No flaming droplets were produced by these samples, with the exception of one test out of six, as shown in table 1:

TABLE 1

NASA FLAME SPREAD DATA

| Test | Interlayer Thickness | Self-Extinguished | Smoke Observed | Dripping Observed |
|---|---|---|---|---|
| 1. | 0.86 mil | yes | no | none |
| 2. |  | yes | no | none |
| 3. | 0.76 mil | yes | no | none |
| 4. |  | yes | no | 6 flaming drops |
| 5. | 0.56 mil | yes | no | none |
| 6. |  | yes | no | 1 non-flaming drop |

Samples with thicker interlayers (one and two mils) were tested, but these samples generally produced more smoke and flaming droplets. It was concluded from these screening test results that samples with less than one mil thick interlayers performed best. Moreover, such samples have the advantage of requiring less material and, hence, costing less.

EXAMPLE 2

Further testing on the composite material described above was done by an outside, independent laboratory. Two tests were run, one for flame spread (ASTM-E162) and one for smoke density (ASTM-E662). The ASTM flame spreading test is different than the NASA test because the sample is exposed to an external source of radiant heat during testing, as would be the case in a large fire. The ASTM smoke density test is more rigorous than the observations of smoke made during the NASA test, because smoke density is measured quantitatively, by light transmission in a closed test chamber. No flaming droplets were observed under these test conditions, as shown in table 2:

TABLE 2

FLAMMABILITY & SMOKE DENSITY TEST DATA

| Interlayer Thickness | Flame Spread[1] ASTM-E162 | Smoke Density[2] ASTM-E662 |
|---|---|---|
| 1.00 mil | 0.5 | 46.3 |
| 0.86 mil | 1.0 | 22.3 |
| 0.76 mil | 0.6 | 19.7 |
| 0.56 mil | 0.7 | 26.0 |

[1] Average of 4 replicate tests.
[2] Average of 3 replicate tests.

The independent laboratory data show that the composite samples do not propagate flames under flame spread test conditions. In addition, the smoke density is very low, particularly in the samples with interlayer thickness less than one mil.

EXAMPLE 3

The two tests (flame spread (ASTM-E162) and smoke density (ASTM-E662)) described above in Example 2 were also done by an outside, independent laboratory on another material constructed in accordance with the present invention. The test results listed in Table 3 below are characteristic of a sandwich composite material prepared by extrusion lamination of two, double-ply sheets of Microfoam ®. The two plies of each double-ply sheet were combined using hot pin bonding. As for the material whose test results are provided in Example 1, the two foam sheets were bound together with an extruded polyethylene interlayer containing fire-retardant additives.

TABLE 3

FLAMMABILITY & SMOKE DENSITY TEST DATA

| Interlayer Thickness | Flame Spread[1] ASTM-E162 | Smoke Density[2] ASTM-E662 |
|---|---|---|
| 0.85 mil | 4.0 | 21.0 |

[1] Average of 4 replicate tests.
[2] Average of 3 replicate tests.

The independent laboratory data show that composite samples incorporating hot pin bonding of the polymer foam layers 11 and 12 achieve satisfactory flame spread and smoke density results.

Although the invention is illustrated and described herein as embodied in a fire-retardant polymer foam composite including a thin film of fire-retardant plastic extruded between layers of polymer foam sheets and bonded together to form a composite sheet of material having a sandwich structure, the invention is nevertheless not intended to be limited to the details shown. Rather, various modifications may be made in the details within the scope and range of equivalents of the claims and without departing from the spirit of the invention.

What is claimed is:

1. A fire-retardant polymer foam composite comprising:
   a first polymer foam sheet layer;
   a second polymer foam sheet layer; and
   a core interlayer including a thermoplastic polymer and fire-retardant additives, said interlayer positioned between and bonding said first polymer foam sheet layer and said second polymer foam sheet layer.

2. A fire-retardant polymer foam composite as claimed in claim 1 wherein said core interlayer is 80% thermoplastic polymer and 20% fire-retardant additives.

3. A fire-retardant polymer foam composite as claimed in claim 1 wherein said polymer foam sheet layers are polypropylene.

4. A fire-retardant polymer foam composite as claimed in claim 1 wherein said thermoplastic polymer is polyethylene.

5. A fire-retardant polymer foam composite as claimed in claim 1 wherein said fire-retardant additives are an aromatic bromide compound and antimony oxide.

6. A fire-retardant polymer foam composite as claimed in claim 5 wherein said fire-retardant additives further include a polyethylene base.

7. A fire-retardant polymer foam composite as claimed in claim 1 wherein said core interlayer is a thin film.

8. A fire-retardant polymer foam composite as claimed in claim 7 wherein said core interlayer is in the range between 0 and 1 mil thick.

9. A fire-retardant polymer foam composite as claimed in claim 8 wherein said core interlayer is between 0.56 mil and 1 mil thick.

10. A fire-retardant polymer foam composite as claimed in claim 1 wherein at least one of said first polymer foam sheet layer and said second polymer foam sheet layer includes multiple plies allowing increased thickness.

11. A fire-retardant polymer foam composite as claimed in claim 10 wherein said multiple plies of said at least one of said first polymer foam sheet layer and said second polymer foam sheet layer are bonded together by hot pin perforation bonding.

12. A fire-retardant polymer foam composite comprising:
   a first polypropylene foam sheet layer;
   a second polypropylene foam sheet layer; and
   a thin film core interlayer between 0.56 and 1 mil thick including 80% polyethylene and 20% a combination of aromatic bromide compound and antimony oxide in a polyethylene base and forming a bonding layer between said first polypropylene foam sheet layer and said second polypropylene foam sheet layer.

13. A fire-retardant polymer foam composite comprising:
   a first polymer foam sheet layer;
   a second polymer foam sheet layer; and
   a core interlayer positioned between said first polymer foam sheet layer and said second polymer foam sheet layer and including a thermoplastic polymer and fire-retardant additives, wherein said core interlayer is bonded to said first polymer foam sheet layer and to said second polymer foam sheet layer by hot pin perforation bonding.

* * * * *